United States Patent [19]

O'Mara et al.

[11] Patent Number: 4,758,354

[45] Date of Patent: Jul. 19, 1988

[54] SEPARATION PROCESS

[75] Inventors: Dion P. O'Mara, Vienna, Va.; Albert F. Hadermann, Ijamsville, Md.; Jerry C. Trippe, Fairfax Station, Va.

[73] Assignee: General Technology Applications, Inc., Manassas, Va.

[21] Appl. No.: 918,896

[22] Filed: Oct. 15, 1986

Related U.S. Application Data

[63] Continuation-in-part of Ser. No. 807,947, Dec. 12, 1985.

[51] Int. Cl.[4] .................................................. C02C 1/22
[52] U.S. Cl. ..................................... 210/728; 210/732; 210/776; 210/925; 428/407; 523/201
[58] Field of Search ............... 210/728, 729, 732, 776, 210/925; 427/222; 523/201, 204, 205; 524/579; 428/407

[56] References Cited

U.S. PATENT DOCUMENTS

| | | | |
|---|---|---|---|
| 3,358,838 | 12/1967 | Kosar et al. | 210/776 |
| 3,426,902 | 2/1969 | Kilpert et al. | 210/776 |
| 3,632,369 | 1/1972 | Hahn | 117/16 |
| 3,637,080 | 1/1972 | Markel | 210/776 |
| 3,769,207 | 10/1973 | Baer | 210/703 |
| 3,830,370 | 8/1974 | Glaeser et al. | 210/776 |
| 4,066,539 | 1/1978 | Hachisu et al. | 210/36 |
| 4,206,080 | 6/1980 | Sato et al. | 210/925 |
| 4,340,076 | 7/1982 | Weitzen | 137/13 |
| 4,345,013 | 8/1982 | Diamond et al. | 430/106.6 |
| 4,420,400 | 12/1983 | Weitzen | 210/732 |
| 4,420,573 | 12/1983 | Fogg et al. | 210/925 |
| 4,433,123 | 2/1984 | Mack | 526/139 |
| 4,550,033 | 10/1985 | Boutin | 427/222 |
| 4,560,482 | 12/1985 | Canevari | 210/925 |
| 4,584,244 | 4/1986 | Fenton | 51/281 |
| 4,622,193 | 11/1986 | Kresge et al. | 264/141 |
| 4,626,472 | 12/1986 | Boutin | 428/407 |

Primary Examiner—Peter Hruskoci
Assistant Examiner—Coreen Y. Lee
Attorney, Agent, or Firm—Roland H. Shubert

[57] ABSTRACT

A method for separating liquids, particularly hydrocarbons from water, whereby a small amount of a high molecular weight polymer is dissolved in the hydrocarbon to render it viscoelastic. A hydrocarbon layer is then mechanically removed from the water in a manner which causes rapid stretching of the hydrocarbon with attendant development of elastic properties in the hydrocarbon layer. The polymer may be applied to the surface of the hydrocarbon as droplets of a relatively concentrated polymer solution or as solid particulates having a polymer core covered by a powdered solid material which is non-reactive toward the polymer.

24 Claims, 2 Drawing Sheets

10μm

1μm

SEPARATION PROCESS

CROSS-REFERENCE TO RELATED APPLICATIONS

This application is a continuation-in-part of U.S. patent application Ser. No. 807,947 which was filed on Dec. 12, 1985.

BACKGROUND OF THE INVENTION

1. Field of the Invention

This invention relates generally to the separation of non-miscible liquids and to compositions useful in that separation.

More specifically, this invention relates to the separation of hydrocarbons, colorinated hydrocarbons, and similar liquids from water.

In one preferred embodiment, this invention is directed to the removal and recovery of spilled hydrocarbons from the surface of a body of water.

2. Description of the Related Art

The use of high molecular weight polymers to aid in the control of oil spills and to allow recovery of the oil has been disclosed in commonly assigned U.S. Pat. No. 4,420,400. That patent describes a process for bodying a liquid hydrocarbon by dissolving sufficient polymer therein to substantially increase its effective viscosity and thereby converting the liquid to a semi-solid gel or to a rubbery solid. Successful practice of the disclosed process requires that the polymer be cryogenically comminuted and applied to the hydrocarbon in association with a cryogenic refrigerant.

Another commonly assigned patent, U.S. Pat. No. 4,340,076 to Weitzen, discloses a cryogenic process for dissolving polymers.

Weitzen found that high molecular weight polymers would very rapidly, almost instantaneously, dissolve in solvents for those polymers if the polymer was comminuted at cryogenic temperatures and the resulting polymer particles were introduced into the solvent without allowing them to warm. Polymer concentrations in the solution ranging from a few parts per million to 15% or more could readily be obtained. Essentially no polymer degradation, as indicated by a reduction in the molecular weight of the polymer, occurs during the dissolution.

It is also common to prepare extremely dilute solutions—usually between about one and one hundred ppm—of high molecular weight polymers in solvents such as hydrocarbons. Such solutions display unusual and useful flow characteristics.

In particular, certain linear polymers, such as the high molecular weight alpha-mono olefinic polymers are noted for their effectiveness as drag reducing agents and as anti-misting agents. A drag reducing agent is a polymer which, when dissolved in a solvent, substantially reduces the friction loss during turbulent flow of the solution. An anti-misting agent is a polymer which, when dissolved in fuel, serves to significantly increase medium droplet size and reduce flammability of fuel sprays caused by high velocity wind shear such as occurs during an aircraft crash landing.

However, those high molecular weight polymers are notoriously difficult to dissolve without degradation and without significant reduction in molecular weight. It is not uncommon for such polymers to require several weeks of gentle agitation in a solvent to dissolve completely. Even when the concentration of polymer in such solutions is limited to a few percent at best because of the rapid increase in viscosity with increasing polymer concentration.

Among the approaches taken in the prior art to the problem of preparing polymer solutions is that described in British Patent No. 1,452,146. That patent describes a method and apparatus for dissolving high molecular weight polymers on a large scale in solvents such as crude oil without significant polymer degradation. Patentees use a dissolving vessel having at least two compartments formed by a partition with provision for liquid communication between the compartments at the top and bottom of the partition. Polymer is introduced into moving or agitated solvent within the vessel to form a slurry. Agitation is accomplished by sparging gas into the bottom of one of the compartments to disperse the polymer particle throughout the solvent so as to prevent the polymer particles from agglomerating and to speed the dissolution process. Exemplary data set out in the patent shows the dissolving of crumb or cut polyisoprene of about 8 million molecular weight in crude oil at 32° to form a solution of about 0.92% in about 120 to 160 hours. The molecular weight of the rubber was reduced by about 10% during the dissolution. The maximum concentration of polymer obtainable is determined by the viscosity of the final solution and, for high molecular weight polymers, maximum concentration ranges from about 0.5 to 2% by weight. The solution of polymer obtained is then metered into a flowing stream of crude oil to provide drag reducing effects.

Yet another approach to the preparation of dilute solutions of high molecular weight polymers is set out in the Mack patent, U.S. Pat. No. 4,433,123. Mack polymerizes an olefin in a suitable solvent to obtain a relatively concentrated polymer solution. The entire mixture, containing polyolefin, solvent and catalyst particles, is used without separation to make up dilute solutions of the polymer in crude oil or other hydrocarbons.

This last approach, to use the entire reaction mixture of a polymerization process, is presently most favored from a commercial standpoint because of the great difficulties experienced in dissolving solid polymers without degradation. Drag reducing agents in field use today typically comprise a high molecular weight polymer dissolved in the polymerization solvent, which may be hexane or heptane, at a concentration ranging from a low of 2 to 3% to a maximum of 11 to 12%. These polymer solutions at typical commercial concentrations are thick, viscous liquids which are highly thixotropic and are also highly viscoelastic. They are commonly transported and stored in containers which can be pressurized with an inert gas to pressures of 30 to 70 psig in order to discharge the liquid from the container. Generally speaking, the lower the polymer concentration, the more rapidly and easily it will dissolve in crude oil or other liquids. The upper limit to polymer concentration is set by practical considerations including the need for an acceptably short dissolving time and the need to handle the concentrated polymer solution using readily available and reasonably priced equipment.

It has also been suggested in U.S. Pat. No. 4,584,244 to prepare polymers in the form of agglomeration resistant, free-flowing powders by coating the polymer particles with alumina. This was accomplished by freezing a mixture of the polymer and alumina and thereafter grinding the frozen mixture.

As may readily be appreciated, these prior art approaches to the task of dissolving a high molecular weight polymer in an oil layer floating on water, as is required to practice certain embodiments of this invention, is unwieldly or impossible to accomplish using methods known in the art. Dissolving a solid polymer directly into a crude oil or other solvent liquid is very time consuming and usually results in significant degradation of the polymer. The dissolving process of the Weitzen patent, U.S. Pat. No. 4,340,076 requires a source of liquid nitrogen for its operation as does U.S. Pat. No. 4,420,400. The present commercial approach to the preparation of dilute polymer solutions, which utilizes the entire polymerization mixture, is unwieldy because the polymer solution must be transported and stored in pressure vessels such as those used to ship and store propane and butane. It also incurs a substantial financial penalty for transportation because little more than 10% of the mixture is polymer. Further, the polymerization mixture is a very difficult liquid to handle. It is highly viscoelastic and extremely thixotropic, the breakout viscosity being as high as several million centipoise.

It is evident that the prior art approaches to dissolving polymers present practical and economical difficulties when the solvent is widely dispersed as, for example, is a layer of oil on water.

SUMMARY OF THE INVENTION

Non-miscible liquids are separated one from the other by dissolving a high molecular weight polymer in one of the liquids to impart viscoelastic properties to the resulting solution and thereafter mechanically removing the polymer solution from the other liquid in a manner which causes stretching of the solution. The separation process is especially effective in the control and recovery of oils and other hydrocarbons spilled on the surface of a body of water. For this purpose a high molecular weight rubbery polymer, such as polyisobutylene, is effective at concentrations as low as about 50 ppm. There is also provided liquid and powdered polymer formulations adapted for effective application to hydrocarbons floating on a water surface.

Hence, it is an object of this invention to separate non-miscible liquids.

It is another object of this invention to provide a process for the control of oil spills on a water surface and to recover the spilled oil.

A further object of this invention is to provide liquid and powdered polymer formulations adapted for convenient application to and rapid dissolution in a hydrocarbon slick floating on the surface of water.

Other objects of this invention will be apparent from the following description of preferred embodiments and exemplary uses.

BRIEF DESCRIPTION OF THE DRAWING

Certain exemplary embodiments of the invention are illustrated in the drawing in which.

DESCRIPTION AND DISCUSSION OF THE INVENTION

Figure 1:
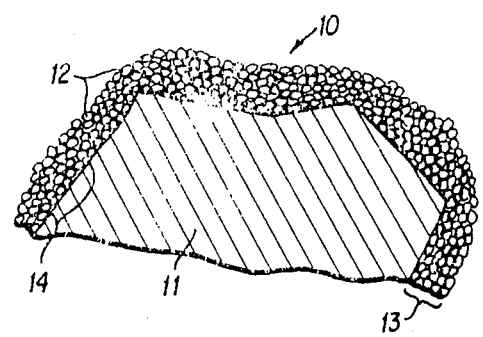
FIG. 1 is a stylized view of a partial cross section of a single coated polymer particle.

This invention includes a process for separating and removing one non-miscible liquid from another. Specifically, a hydrocarbon, an organic compound, a halogenated hydrocarbon or mixtures of these are separated from water. In addition, this invention includes solid and liquid compositions adapted to quickly dissolve in non-aqueous liquids rendering those liquids viscoelastic thus allowing separation of the non-aqueous liquid from water through use of the inventive process.

Various embodiments of this invention will be described and discussed in detail with reference to the drawing figures in which like reference numerals refer to the same component illustrated in different figures. In all instances, the discussion will center around the removal of a liquid hydrocarbon from water, it being understood that the techniques and processes described are generally applicable to other pairs of non-miscible liquids.

Referring first to FIG. 1, there is shown a portion of a single particle 10 of a polymer composition useful in the practice of this invention. The composition comprises a center, or core, polymer particle 11 shown here in section. Polymer core particle 11 is preferably prepared by comminuting a more massive form of the polymer, in granulated or crumb form for example, using a hammer mill, pin mill or other suitable comminuting means. The polymers used in preferred embodiments of this invention comprise those thermoplastics, both natural and synthetic, which impart viscoelastic properties to a solution. Such polymers typically display glass transition temperatures in the range of about $-10°$ C., to about $-100°$ C. At temperatures below the glass transition temperature, the polymers become brittle and can be readily comminuted by use of impact-type mills. Exemplary polymers useful in this invention include polyisobutylene, polyisoprene, polyalphaolefins, polybutadiene, copolymers of styrene and butadiene, copolymers of ethylene and butene-1, fluorelastomers such as the copolymers of vinylidene fluoride and hexafluoropropylene and other polymers of a generally similar nature.

In order to successfully comminute the polymers useful in this invention, it is necessary to chill the polymers below their glass transition temperature and to maintain the temperature below that point during comminution. Chilling is most conveniently accomplished by use of a liquid cryogenic refrigerant, preferably liquid nitrogen. Comminution of the polymer produces fragments or particles having fresh, clean surfaces. It has been found that preservation of these clean surfaces is mandatory if rapid dissolution of the polymer particles in a solvent is to be obtained. It is believed that active sites on freshly cleaved polymer surfaces react with the oxygen and water vapor normally present in the atmosphere to produce a film or skin around the particle which inhibits or greatly slows the dissolution of the polymer in a solvent. For this reason, it is mandatory also that the comminution be carried out in an inert atmosphere. The twin requirements of chilling the polymer and maintaining it in an inert atmosphere during comminution are best met through use of liquid nitrogen as a cryogenic refrigerant and inerting agent. It is possible but not econmically practical, to use other inert cryogenic refrigerants such as liquid argon rather than liquid nitrogen.

Polymer particles resulting from comminution are commingled with a particulate coating agent 12 while continuing to maintain the polymer particles in a chilled and inert atmosphere. The coating agent 12 must be a solid at ambient to moderately elevated temperature; must be non-reactive toward the polymer; and, most importantly, must have a particle size that is much smaller than is the particle size of the polymer. It is necessary that the median diameter of the coating agent particles 12 be less than one-tenth the median diameter of the polymer particles 11 and it is preferred that the difference in particle size between the two substances, coating agent and polymer, be substantially greater than that.

The particle size to which the polymer is comminuted is not critical but polymer particle size does affect the dissolving rate of the polymer composition in a solvent. It is generally preferred that the median polymer particle diameter be less than about 0.5 mm, or about 35 mesh. Additional advantage is often gained by reducing the median polymer particle diameter below about 0.075 mm which is equivalent to about 200 mesh. In all cases it is preferred that the median diameter of coating agent particles be less than about 0.01 mm or 10 micrometers. Experience to date indicates that the best results are obtained with coating agents having a median particle diameter of about 0.1 to about 10 micrometers.

The commingled polymer particles 11 and coating agent particles 12, in an inert atmosphere and at a temperature below the glass transition temperature, are then continuously mixed as by tumbling while the mixture is warmed to and above the glass transition temperature of the polymer. This procedure may conveniently be accomplished in a batch-wise fashion using a rotating V-Type blender. Heat transfer from the atmosphere through the blender shell is sufficient to warm the chilled mixture to and above the glass transition temperature of the polymer. It is preferred that tumble mixing be continued until the mixture approaches ambient temperature.

Tumble mixing of the polymer particles and coating agent while allowing the temperature to warm results in the formation of composite particles, each having a central core consisting of a solid polymer particle 11 with a multi-layered shell 13 surrounding the core and made up of particles 12 of the coating agent. It is, of course, necessary to provide a sufficient amount of coating agent relative to the polymer particles to allow for the formation of that multi-layered shell. The minimum amount of coating agent required on a weight or percentage basis depends upon the relative size of the coating agent particles as compared to the polymer particles as well as upon the specific gravity of the components and will generally be in excess of 15% by weight of the mixture. The optimum amount of coating agent usually is considerably higher than that and typically ranges from about 20% to about 75% by weight of the composition.

The multi-layered shell 13 of coating agent particles tightly adheres to the polymer core particle 11 and is not disrupted by physical handling. There are a number of reasons for the stability and physical integrity of the coating agent shell. Those polymers useful in this invention generally display a surface tackiness at temperatures above the glass transition temperature. Consequently, polymer particles, especially those particles having freshly formed surfaces, tend to agglomerate or stick together. At temperatures below the glass transition temperature, however, those same polymers form free flowing and non-adherent particles. Tumble mixing of the polymer particles with the much smaller coating agent particles while the temperature is raised through the glass transition temperature allows the polymer particles to be coated prior to the formation of tacky polymer surfaces.

There are other considerations of equal or possibly greater importance. The interaction between very finely divided particles to form agglomerates is well known. Also, the adherence of microscopic particles to solid surfaces is well known and has been much studied. For example, particles having a diameter of less than about 10 micrometers adhere so strongly to surfaces that accelerations of the order of $10^3$ to $10^4$ g-units are not sufficient to dislodge them from the surface. The forces involved in the adhesive interaction of small particles, one to another or to the surface of a larger particle, include molecular forces and to some degree Coulomb forces; the magnitude of these forces decreasing rapidly with increasing distance between the contiguous surfaces. Other forces arise when two particles contact each other or the surface of a larger particle. Such forces include electrical interactions due to surface charges and the like.

The surfaces of all of the particles, coating agent particles and polymer particles alike, also adsorb a gas layer. The gas adsorbed is that inert gas which is present during the formation of the composite particles through mixing and warming; usually nitrogen. All of the interstices 14 between and around coating particles 12 making up the multi-layered shell 13 also are filled with nitrogen or other inert gas. Consequently, the composite particles 10 may be exposed to the atmosphere and freely handled without the use of cautionary measures because the surfaces of each polymer particle 11 are protected from atmospheric contact by inert gas adsorbed on and filling the interstices between coating agent particles 12.

Figure 2:
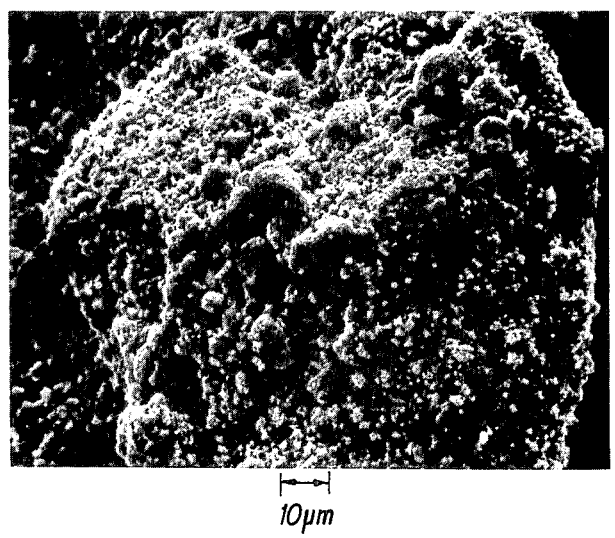
FIG. 2 is a photo-micrograph of a single, coated polymer particle.
Figure 3:
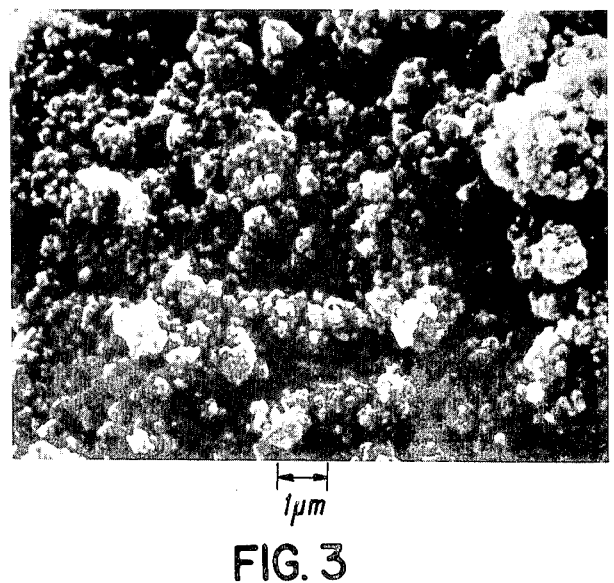
FIG. 3 is a photo-micrograph at higher magnification showing details of the coating surface.

Structural details of the composite particles 10 and particularly of the exterior surface of shell 13 are shown in FIGS. 2 and 3 which are electron micrographs of composite particles prepared by the process of this invention. In both of FIGS. 2 and 3, the particle core is a high molecular weight polyisobutylene while the coating agent is very finely divided tricalcium phosphate (TCP). FIG. 2 shows a single particle 10 having a diameter of about 0.1 mm (100 micrometers) as is shown by the scale across the bottom of the Figure. This Figure clearly shows the close packed nature of the TCP particles making up the exterior shell of particle 10. FIG. 3 is a detailed view of the surface of a particle 10 at much higher magnification. As can be seen by reference to the scale at the bottom of this Figure, the individual particles are typically much less than one micrometer in diameter. It may also be appreciated from study of this Figure how effectively shielded from atmospheric contamination is the central polymer core by the multi-layered TCP coating with the nitrogen gas adsorbed on particle surfaces and filling the interstices between particles.

As has been set out previously, the coating agent must be a solid at ambient to moderately elevated temperature; must be non-reactive toward the polymer; and must have a particle size that is much smaller that in the particle size of the comminuted polymer particles. In experimental tests using a variety of coating agent compositions, it was found that all compositions tested were operative to produce coated polymer particles in accordance with this invention provided that the criteria set out above were met. Coating agents tested included amorphous silicon dioxide, kaolin clay, calcined kaolin clay, graphite, Teflon powder and tricalcium phosphate. Other exemplary coating agents include finely divided bauxite, alumina, calcium carbonate and similar substances; finely divided polymer powders other than Teflon including, for example, polyolefin powders and polyvinylchloride powder; activated carbon, solid organic compounds and the like.

This is not to say, however, that the compositions obtained through use of the different coating agents are all of the same or equal usefulness. The properties of the coating agent used, its wettability by hydrocarbons for example, do affect the results obtained in specific process applications. In particular, proper selection of the coating agent is of considerable importance in those compositions preferred for use in the control of oil spills on water.

A coating agent comprising TCP surrounding a polymer core of a high molecular weight thermoplastic, such as polyisobutylene, poly alpha olefins and the like is preferred for use in this process. Polymer particles having a TCP shell can be briefly exposed to, and even slurried in, water without substantial reduction in their later solubility rate in hydrocarbons. Even after the TCP shell has been externally wet with water, hydrocarbons will rapidly penetrate the shell and dissolve the polymer.

However, in all of those circumstances in which particles of the polymer are likely to contact water as well as hydrocarbon, as is the case with most oil spills, it is preferred that a specially treated TCP-polymer composition be used. The TCP-coated polymer particles, as previously described, have a specific gravity greater than that of water. Consequently, when a particle having a mass sufficient to overcome the surface tension of water falls on water, it immediately sinks and is lost to the process. The smaller particles, which do not immediately sink, tend to progressively agglomerate to form patches or films on the water. These pathces, of course, are much more slowly dissolved in oil than are discrete particles of the polymer composition thus adversely affecting the process. Further, the natural particle size distribution obtained through the comminuting and coating process, typically includes a finer fraction which tends to drift with the wind when the powder is spread over an oil slick.

These disadvantages are obviated by subjecting the particulate polymer compositions, described previously, to a treatment step in which the finer particles are agglomerated to form larger and more uniformly sized particulates. Those larger agglomerates are then rendered hydrophobic by incorporating a water repelling agent on the surface thereof.

Agglomeration is conveniently accomplished by tumbling the polymer composition particles, as in a V-type blender, while adding to the particles a small amount of a wetting agent such as water. The size of the resulting agglomerates is primarily dependent upon the amount of added water. A product particle size on the order of about 40 mesh works well in most applications and that product size typically requires the addition of about 0.5 to about 5% water. After the agglomerates are formed, the agglomerate surfaces are made hydrophobic by coating the surfaces with a water repelling agent such as, for example, an alkaline earth metal salt of a fatty acid, a silicone, or other known water repellents. Of those wetting agents useful in the invention, calcium stearate is presently preferred because of its effectiveness, its known safety and its relative economy.

When using calcium stearate as the water repelling agent, it may be added in fine powder form to the agglomerates within the blender or other agglomerating device and dispersed on the surfaces of the agglomerated particles by further rotation of the blender. It is not generally necessary to interpose a drying step between the agglomeration and the application of the water-repelling agent but such a drying step can be advantageous if a relatively large amount, more than 2 to 3%, of water is used in the agglomeration. The amount of calcium stearate needed to provide water repellency depends to some extent upon the size of the agglomerate particles and typically ranges from about 0.5 to 5%. In mose cases, little improvement in water repellency is seen upon increasing the calcium stearate loading beyond about 2%. The calcium stearate treated agglomerate particles readily float upon water. It is believed that this ready floatation is due to both surface tension effects and to a decrease in the bulk specific gravity of the agglomerates as compared to the individual coated particles making up the agglomerates.

As has been previously set out, the process embodiment of this invention resides in the imparting of viscoelastic properties to a hydrocarbon or analogous liquid and thereafter physically or mechanically recovering the hydrocarbon liquid in a manner which imparts stretching forces to the liquid. The viscoelasticity imparted to the hydrocarbon liquid as a high molecular weight polymer dissolves therein causes the liquid to act as a stretchable rubber-like sheet. The apparent strength, or tenacity, exhibited by the viscoelastic liquid increases as the rate of stretching increases to the point where the liquid layer or film thins out and finally breaks. Moreover, modest polymer concentrations, less than 0.25%, render many hydrocarbons sufficiently viscoelastic as to allow the pulling of a hydrocarbon film from a water surface by means of a vacuum nozzle held as high as three to six inches above the water surface.

Figure 4:
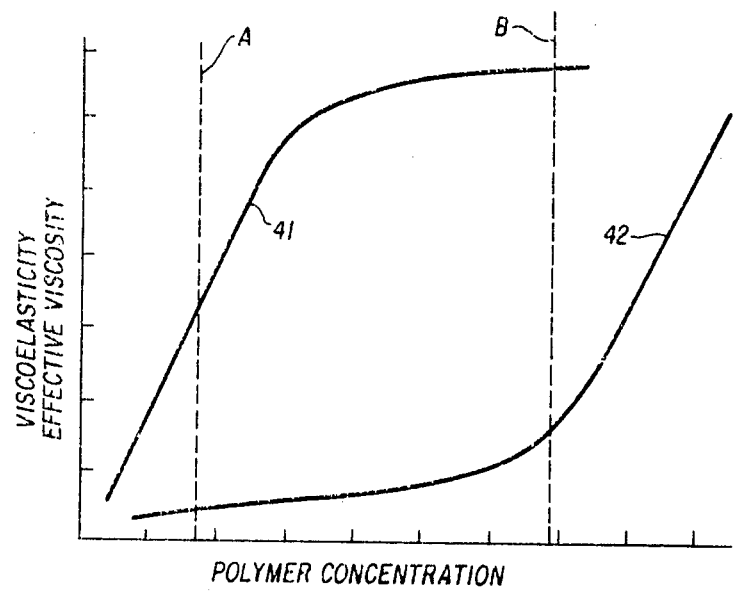
FIG. 4 is a stylized plot illustrating the relationship of the viscoelastic properties and the effective viscosity of a solution to the polymer concentration.

It is important to the understanding of this invention to distinguish between viscoelasticity and, what is termed here, the apparent viscosity of the hydrocarbon or other solvent liquid. A solvent liquid, such as oil, having a high molecular weight polymer dissolved therein is a decidedly non-Newtonian fluid. Hence the common viscosity relationships, which assume a Newtonian fluid, do not apply. Referring now to FIG. 4, there is shown a stylized plot illustrating the general relationships among viscoelasticity, effective viscosity and polymer concentration. Polymer concentration is plotted as the abscissa while both viscoelasticity and effective viscosity are plotted in arbitrary units as the ordinate.

The curve obtained for viscoelasticity in this plot is shown at 41 while that for effective viscosity is shown at 42. As is shown in the figure, viscoelasticity increases rapidly with the concentration of polymer dissolved in the liquid finally becoming asymptomatic to some ultimate value. Effective viscosity, on the other hand, tends to increase far more slowly with polymer concentration and then increases sharply as gel formation and solidification of the liquid becomes dominant. No mathematically precise definitions of either viscoelasticity or effective viscosity can be offered. It is important to the successful practice of this invention that sufficient polymer be dissolved in the liquid so as to impart viscoelasticity thereto but also that the amount of dissolved polymer be less than that which causes a substantial increase in effective viscosity. An appropriate operating range lies between lines A and B of FIG. 4. No specific values can be placed on the concentrations represented by A and B as those values depend upon polymer molecular weight, solubility relationships between liquid and polymer, and the like. Generally speaking, A will be more than 50 ppm and B will be less than 2.5%.

For the purpose of this disclosure, viscoelasticity is defined as the strength or tenacity exhibited by a thin layer of liquid during rapid stretching. Effective viscosity is defined as the flow behavior of a liquid under slight stress but essentially at rest. A qualitative measure of the effective viscosity of a liquid, oil for example, may be obtained by observing the rate at which an unconfined drop of oil spreads across a water surface.

The presence of viscoelasticity in a liquid is readily observable merely by dipping thumb and forefinger into the liquid, bring one into contact with the other, and separating the two. If filaments of liquid form joining the thumb and finger during the separation, the liquid is viscoelastic. There is also a semi-quantitative measure of viscoelasticity using a device known as the ductless siphon. The ductless siphon phenomenon is the rise of an unsupported liquid column from a liquid surface into the opening of a capillary suspended above the liquid surface and providing suction to draw the column upward. The maximum obtainable height of the unsupported liquid column, which can be as great as 20 to 25 cm, is a general measure of the viscoelasticity of the liquid.

An explanation of the siphon effect lies with fluid elasticity with elongational viscosity probably being the controlling parameter in view of the stretching motions of the liquid flow. Thus, the flow continues between the liquid surface and the capillary tip because elongational strain rates in the rising column are high enough to generate sufficient tensile stress to support the column weight. As the distance between the capillary tip and the liquid surface increases, the weight of the liquid column increases and slows the flow. Eventually, a level is reached at which the strain rate is reduced to the point where rheological stresses can no longer support the column and it breaks.

The elongational viscosity of the liquid solution, and hence its viscoelasticity, increases rapidly at an exponential rate with increasing polymer molecular weight. Consequently, the higher the molecular weight of the polymer used, the lower is the concentration of polymer required to produce useful viscoelastic effects in the solution. It is not generally advisable to use a polymer having a molecular weight below about 1 million as such relatively low molecular weight polymers require inappropriately high concentrations to obtain the full advantages of the process. Further, low molecular weight polymers tend to cause the effective viscosity of the solution to rise much more rapidly, relative to viscoelasticity, than do higher molecular weight polymers. In most circumstances, it is preferred that the molecular weight of the polymer used in the process be in excess of about 2.5 million. There appears to be no upper limit on the molecular weight of soluble polymers useful in this process.

Figure 5:
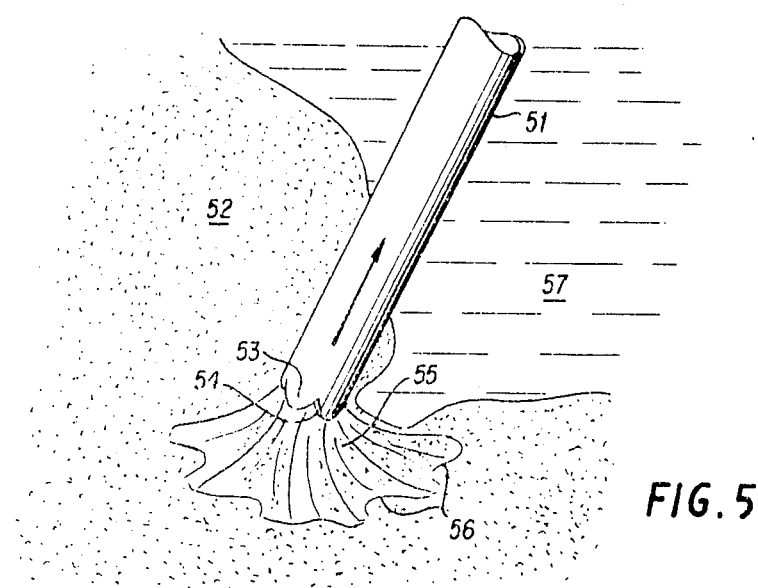
FIG. 5 depicts the removal of a viscoelastic oil slick from water using a vacuum nozzle positioned above the water surface.

In one embodiment, this invention makes use of a phenomenon similar to that of the ductless siphon to remove an oil slick from water. This is depicted in FIG. 5 wherein a vacuum nozzle 51 is positioned above the surface of an oil film 52 floating on a body of water. The nozzle 51 is connected to a source of vacuum (not shown) in a manner well known in the art. Oil film 52 is made viscoelastic by dissolving therein a polymer such as polyisobutylene prepared either in a stable particulate form as described earlier, and preferably as hydrophobic agglomerates, or as a liquid concentrate which will be described later.

The tip of nozzle 51 may be somewhat constricted as by means of inturning lobes 53 paired with axial slots 54. The suction action of the nozzle pulls sheets and strands 55 of oil from the surface. This suction action causes a rapid and pronounced stretching of the oil film in the area adjacent the nozzle tip. The boundary 56 of the thinned and rapidly stretching oil film is often clearly defined as is shown in the drawing. More oil from the main oil film or slick is drawn into the nozzle area to replenish that removed leaving a clear water surface 57 devoid of oil. Under typical conditions, the viscoelasticity developed in the oil by the dissolved polymer allows an unbroken oil sheet to be drawn from a distance considerably in excess of 10 meters from the nozzle. By maintaining the nozzle tip above the liquid surface, suitably some 2 to 10 cm above the surface, the oil drawn into nozzle 51 is essentially free from water.

It is common practice today to remove spilled hydrocarbons from the surface of water using a variety of mechanical skimmers including those which use weirs, disks, a drum or a belt, as well as vacuum nozzles, to contact to oil and remove it from the water surface. Performance of the various types of skimmers is closely related to the properties of the oil, particularly the viscosity of the oil. Each of these skimmers has the ability to rapidly clean the oil from the area immediately around it. After that time, the performance of a skimmer is determined not by its own capability to pick up oil but by the rate at which new oil flows across the water surface to the skimmer and by the rate at which the skimmer can be moved to new patches of oil.

All of the skimmers, whether they be a vacuum apparatus, a weir, a disk, drum or belt type, are limited in the rate at which they can be operated. For example, with a disk skimmer, the more rapidly the disks are rotated the greater the rate of pick-up until, at a certain point, unacceptable amounts of water are collected. Also, the rate of replenishment of oil on the water surface adjacent the disk limits the rate of oil pick-up. As can be appreciated, the viscosity of the spilled oil plays a major role in defining the maximum pick-up rate as viscosity affects both the oil loading on the disk (or other moving surface) as well as the flow rate of oil across the water surface.

Viscoelasticity imparted to the oil by the polymer dissolved therein improves in dramatic fashion the performance of conventional oil skimmers. As the oil layer is pulled from the water surface by the skimmer, the viscoelasticity imparted to the oil by the dissolved polymer causes the oil layer to act as a stretchable rubber-like sheet. A disk or drum skimmer can then be operated at a higher rotational velocity without collecting large amounts of water. Because of the viscoelasticity, oil is replenished at the skimmer site much more rapidly than is the case with untreated oil. Further, the oil as it is being depleted from the water surface does not break up into patches but rather is pulled in to the skimmer. All of these effects combine to enhance the recover efficiency of a conventional skimmer by a factor as great as 3 to 6.

The concentration of polymer required to produce an adequate degree of viscoelasticity in a spilled oil depends in large part upon the molecular weight of the polymer and upon the viscosity of the oil. Generally speaking, the higher the polymer molecular weight and the higher the oil viscosity, the lower is the polymer concentration required to provide sufficient viscoelasticity to substantially improve skimmer performance. About 50 ppm by weight of polymer in crude oil represents about the lowest practical concentration to obtain significant improvement in skimmer efficiency. Little improvement is gained by providing polymer concentrations in excess of 1.0%, or 10,000 ppm, and in most instances appropriate concentrations of polymer in the oil will range from about 100 to 1000 ppm.

As was noted previously, it is sometimes advantageous to prepare a relatively concentrated, typically about 2% to about 8% depending upon the polymer molecular weight, first polymer solution and to apply droplets of that first solution to the surface of an oil slick or similar treatment site. The relatively concentrated first solution then dissolves in the larger liquid mass to render it viscoelastic thus achieving the same results as does the solid polymer compositions.

It has been found that a judicious selection of the solvent used to prepare the first polymer solution can offer substantial operating advantage to the obtaining of a dilute viscoelastic solution of polymer in oil or other hydrocarbon. Specifically, it has been found that the apparent viscosity of a polymer solution has an inverse relationship to the solubility of the polymer in the solvent liquid. Further, it has been found that the rate at which the first, relatively concentrated, polymer solution dissolves in a second liquid, such as oil or the like, bears a direct relationship to the relative solubility of the polymer in the second liquid as compared to its solubility in the solvent of the first solution. Consequently use of a poor polymer solvent, relative to the solubility of the polymer in the second liquid, to prepare the first polymer solution results in a less viscous first solution with attendant advantages in its application to and distribution over the surface of the second liquid. Additionally, those solubility differences substantially speeds the migration of polymer particles from the first solution into the second liquid.

In practical application of those observed principles, a high molecular weight polymer such as polyisobutylene is dissolved first in a relatively poor solvent, as for example an aromatic hydrocarbon such as xylene, to form a relatively concentrated first polymer solution. Dissolution of the polymer in the solvent is best accomplished through use of the cryogenic process described in the Weitzen U.S. Pat. No. 4,340,076. The observed, or effective, viscosity of that first solution is substantially less than is that of an equally concentrated polyisobutylene solution in a good solvent such as n-heptane. The less viscous solution is, of course, easier to disperse and apply to the surface of a second liquid than is the more viscous solution. Many crude oils and refined petroleum fractions are far better solvents for polyisobutylene than is xylene or other aromatic hydrocarbons. Consequently, when the first polymer solution is applied to such a crude oil or refined fraction, the polymer molecules rapidly migrate from the first solution to the second liquid with attendant development of viscoelastic properties in the second liquid.

The relatively concentrated first polymer solution may be applied to the surface of an oil slick or similar site in droplet form using spray booms and similar devices. Solid, particulate polymer compositions may be distributed across the surface of an oil spill using any conventional device ordinarily used for the spreading of particulate solids such as seeders, fertilizer spreaders, blowers and the like. A polymer composition comprising a very high molecular weight (above 5 million,) polyisobutylene having a multi-layered shell of TCP particles which have been rendered hydrophobic by dusting with a water repelling agent is most preferred for use in this application.

Various embodiments of the invention are more specifically described with reference to the following examples which are provided to further illustrate but not to limit the invention.

EXAMPLE 1

A quantity of high molecular weight polyisobutylene, designated as Oppanol B246 by the supplier, BASF, was obtained. The polymer was in the form of generally cubic chunks about 1 cm of a side and had been mixed with about 10% by weight of powdered tricalcium phosphate to keep the polymer chunks from sticking together.

The polyisobutylene chunks were fed, together with sufficient additional tricalcium phosphate (TCP) to form a 50—50 by weight mixture of the two components, into a cryo-chiller cooled with liquid nitrogen. The cryo-chiller discharged into a hammer mill, which was cooled with additional liquid nitrogen and equipped with an 0.062 inch, round-holed screen. The comminuted mixture of polyisobutylene and TCP was collected cold and maintained under a protective atmosphere of nitrogen. This mixture was then re-ground using the same hammer mill but equipped with a 0.013 inch herringbone screen. Again the reground mixture was collected cold and maintained under nitrogen.

The TCP used was obtained from the Stauffer Chemical Company, was anhydrous having the chemical formula $3Ca_3(PO_4)_2 \cdot Ca(OH)_2$, had a bulk density of approximately 20 lb/ft$^3$, and had a median particle size of less than about 1 micrometer as observed by electron microscopy.

A sample of the ground mixture, which was at a temperature approximating the boiling point of liquid nitrogen, was removed and examined visually under a microscope. The relatively large polyisobutylene particles were irregular and angular in appearance having sharp edges and verticles. Particles of TCP flowed freely around and among the polymer particles. This sample was allowed to warm to room temperature over a two-hour period and was again examined visually. The polyisobutylene particles had become much more rounded and softened in shape with a disappearance of the sharp edges and angularity previously observed.

The bulk of the ground mixture, weighing about 300 kg and comprising about equal weight fractions of TCP and polyisobutylene, was then transferred while cold and under a nitrogen atmosphere into a large, uninsulated, V-blender. The blender was rotated for about 20 minutes while the contents warmed by means of heat transfer through the blender shell. At the end of that time, the blender contents had warmed to near ambient and were free flowing, homogeneous and granular in appearance. No free polymer or TCP particles could be seen by visual inspection. The blender contents were then packaged in plastic bags.

Samples of the composition were examined by electron microscopy. FIGS. 2 and 3 are exemplary photomicrographs obtained.

EXAMPLE 2

A small quantity of the composition of Example 1 was added to a beaker containing diesel fuel. Particles of the composition were readily wet by the diesel fuel. The polymer core of the particles dissolved so rapidly that viscoelastic properties were imparted to the liquid within about 20 seconds as evidenced by the formation of strands when a stirring rod was removed from the liquid.

Other particles of the composition were placed on a microscope slide and arranged for viewing. Several drops of isooctane were placed on one end of the slide. As the isooctane contacted particles of the composition, the particles were seen to swell rapidly with the granular TCP coating cracking and falling apart as the polymer dissolved in the isooctane.

Particles of the composition were placed on another microscope slide and arranged for viewing. Several drops of water were placed on one end of the slide in the same manner as was the isooctane. So far as could be visually observed, water had no effect on the particles of the composition.

EXAMPLE 3

A sample of polyisobutylene particles coated with TCP prepared in the manner of Example 1 and weighing 1.5 g was placed in 250 ml of water in a stirred beaker. After a period of agitation, the slurry was allowed to settle for about one-half hour at which time essentially all of the particulate composition had settled to the bottom leaving a relatively clear supernatant liquid. The supernatant was decanted off and a fresh 250 ml portion of water was added. This stirring, settling and decantantation procedure was repeated for a total of four times on the same sample in order to determine the stability of the TCP coating toward water.

The settled slurry was filtered through qualitative filter paper and the filter cake was allowed to air dry for about 30 minutes. It was then visually inspected using a stereo microscope. The particles were free flowing and non-agglomerating and all of the particles appeared to have an intact coating of TCP. As was noted previously, the particles settled in water indicating a specific gravity greater than 1.0. Polyisobutylene has a specific gravity less than 1.0 and the TCP used in making the composition had a bulk density of about 20 lb/ft$^3$; about one-third the density of water. This particular lot of TCP-coated polyisobutylene contained about 52% polyisobutylene and 48% TCP by weight. It is evident from these considerations that the shell of TCP particles surrounding each core particle of polyisobutylene is very closely and tightly packed.

The dissolving rate in cyclohexane of particles of the filter cake was visually compared on a microscope slide with the dissolving rate of unwet particles of the same composition. No differences in dissolving rate were observed. It was concluded that extensive water contact with the TCP coating does not adversely affect the rate at which the composition particles will later dissolve in an organic liquid.

EXAMPLE 4

A quantity of the Example 1 polymer composition was applied to a thin oil slick floating in open harbor water using a commercial blower-type, grass seeding device. The force of the air blast when directed downwardly toward the water surface caused the oil slick to part leaving patches of open water. Particles of the polymer composition which struck the water either sank or formed raft-like agglomerates. These agglomerates were slow to dissolve when the oil film again reached their edges and were non-coherent interrupting the viscoelastic properties of the larger oil mass. Smaller particles of the composition drifted with the wind beyond the bounds of the oil slick.

EXAMPLE 5

A quantity of the Example 1 polymer composition was placed into a V-type blender having a separately rotating intensifier bar therein. As the blender rotated, water was slowly introduced through ports in the intensifier bar until a total amounting to about 3% by weight of the polymer composition had been added. The blender was then stopped and the contents examined. Inspection revealed that substantially uniform agglomerates of approximately 40 mesh had been formed. Essentially no fines were present.

A quantity of finely powdered calcium stearate, amounting to about 3% by weight of the polymer composition, was then added to the agglomerates within the blender. The blender was then rotated for a few minutes and the contents were again examined. It was found that the calcium stearate had been dispersed as a coating over the surfaces of the agglomerated particles. Again, no fines were observed. Screening analysis showed a major fraction of the agglomerates to be about 40 mesh.

EXAMPLE 6

A portion of the calcium stearate-treated composition of Example 5 was blown onto the surface of water held in a large glass container. All of the agglomerate particles floated on the water surface. There was no interparticle agglomeration on the water surface as occurred in Example 4.

Thereafter, a quantity of fuel oil was poured onto the water surface and allowed to spread over the surface. Immediate dissolution of the agglomerates in the oil was observed with attendant development of viscoelastic properties as shown by strand formation when an object was dipped into the oil and thereafter removed.

EXAMPLE 7

Some of the polymer compositions described in the foregoing examples were tested to determine their efficiency in various oil spill clean up processes. A laboratory model disk skimmer was constructed and consisted of a single disk with its axis oriented horizontally at a level above the surface of water within a test container. Means were provided at an upper portion of the disk to wipe and remove collected oil from the disk. The rotational speed of the disk was controllable over a wide range.

Tests were run using diesel fuel and a medium weight oil as the spilled hydrocarbons. In each case, a base performance level of the skimmer using the neat hydrocarbon was determined over the range of usable disk rotational speeds. Thereafter, a series of tests were run of each hydrcarbon at different polymer concentrations and skimmer speeds. It was found that the addition of sufficient quantities of the polymer compositions of this invention to impart viscoelastic properties to the spilled hydrocarbon in all cases significantly enhanced skimmer performance. A recovery enhancement factor was arbitrarily defined to be that ratio of the time required to pick up a unit volume of neat hydrocarbon divided by the time required to pick up a unit volume of hydrocarbon treated with the polymer compositions of this invention. Recover enhancement factors of 2 to 3 were routinely achieved.

It was observed that substantial viscoelasticity was imparted to the medium weight oil at dissolved polymer concentrations as low as 50 to 100 ppm. In addition to increasing the hydrocarbon loading on the disk, the viscoelasticity tended to prevent depletion of the oil on the water surface adjacent the disk. Oil was continually drawn to the rotating disk from distant area of the water surface. Further, the oil did not break up into patches or clumps as is commonplace with the untreated, or neat, oil.

Confirmatory tests were performed using several different types of full-size, commercial skimmers on a test pond. The performance of the skimmers operating on spilled hydrocarbons having a sufficient amount of the polymer composition of this invention dissolved therein to render the spilled hydrocarbons viscoelastic exceeded the expectations gained from laboratory experimentation.

EXAMPLE 8

The test procedure of Example 7 was repeated except that the polymer was applied to the oil floating on the water surface in the form of droplets of polyisobutylene dissolved in xylene. Substantially the same results were observed as those of Example 7.

The above examples have been set out to illustrate a number of specific embodiments of this invention. The data and observations presented therein are not to be construed as limiting the scope of the inventive compositions nor their uses.

We claim:

1. A process for separating a liquid from water, said liquid selected from the group consisting of hydrocarbons, organic compounds, halogenated hydrocarbons and mixtures thereof, comprising:
    dissolv ing in said liquid an amount of a thermoplastic polymer sufficient to impart viscoelastic properties to said liquid; said viscoelastic properties causing said liquid to act as a stretchable sheet; and
    mechanically removing said liquid from the water in manner which imparts stretching forces to the liquid while pulling said liquid from the water surface.

2. The process of claim 1 wherein the molecular weight of said polymer is greater than 1 million and wherein the amount of said polymer dissolved in said liquid is greater than 50 ppm.

3. The process of claim 2 wherein said liquid is a hydrocarbon floating on the surface of water.

4. The process of claim 3 wherein said polymer is dissolved in the hydrocarbon by spreading on the hydrocarbon surface a rapid dissolving polymer composition, the individual particles of said composition having a central core consisting of a thermoplastic polymer which dissolves in said hydrocarbon to form a viscoelastic solution, said central core having clean surfaces and being surrounded by a multi-layered shell of an adherent, particulate, coating agent having a particle size less then one-tenth the median diameter of the central core and having the interstices between the coating agent particles and the core filled with an inert gas.

5. The process of claim 4 wherein there is a water repellent covering on the exterior shell surface of said particles.

6. The process of claim 5 wherein said coating agent particles comprise tricalcium phosphate and wherein said water repelling agent comprises calcium stearate.

7. The process of claim 4 wherein the individual particles of said composition are agglomerated to form larger particulates and wherein there is a water repelling material covering the exterior surface of said agglomerates.

8. The process of claim 7 wherein said coating agent particles comprise tricalcium phosphate and wherein said water repelling material comprises calcium stearate.

9. The process of claim 4 wherein the molecular weight of said polymer is in excess of 2.5 million, and wherein the concentration of polymer dissolved in said hydrocarbon is greater than 50 ppm but less than 2.5%.

10. The process of claim 4 wherein said hydrocarbon is removed from the water surface by use of a mechanical skimmer.

11. The process of claim 10 wherein said skimmer is a rotating disk skimmer.

12. The process of claim 10 wherein said skimmer is a rotating drum skimmer.

13. The process of claim 10 wherein said skimmer employs a moving belt to contact said hydrocarbon and remove it from the water surface.

14. The process of claim 10 wherein said skimmer comprises a vacuum nozzle.

15. The process of claim 10 wherein said skimmer employs a weir.

16. The process of claim 3 wherein said polymer is dissovled in the hydrocarbon by distributing on the hydrocarbon surface droplets of a solution of the polymer in a solvent.

17. The process of claim 16 wherein the solvent used to prepare said polymer solution is a poorer solvent for said polymer than is said hydrocarbon.

18. The process of claim 17 wherein said solvent is an aromatic hydrocarbon and wherein said polymer is polyisobutylene.

19. The process of claim 18 wherein said aromatic hydrocarbon is xylene and wherein the concentration of polyisobutylene in said xylene ranges from about 2% to about 8%.

20. In a method for mechanically removing a spilled hydrocarbon from a water surface, the improvement comprising:
    spreading on the surface of said spilled hydrocarbon a rapid dissolving particulate polymer composition in an amount sufficient to provide a polymer concentration in said hydrocarbon in excess of 50 ppm by weight, the particles of said polymer composition having a central core consisting of a high molecular weight thermoplastic polymer which imparts viscoelastic properties to a solution of said polymer in said hydrocarbon, said central core having clean surfaces and being surrounded by a multi-layered shell of an adherent, particulate, coating agent having a particle size much smaller than that of the central core and having the interstices between the coating agent particles and around the core filled with an inert gas, and thereafter mechanically removing said spilled hydrocarbon, now having viscoelastic properties, from the water surface.

21. The method of claim 20 wherein said particulate coating agent is readily wet by oil.

22. The method of claim 20 wherein said polymer is polyisobutylene and wherein said particulate coating agent is tricalcium phosphate.

23. The method of claim 20 wherein said hydrocarbon is crude oil and wherein the polymer concentration therein is in the range of 100 to 1,000 ppm.

24. The method of claim 20 wherein said hydrocarbon is removed from the water surface by use of a mechanical skimmer.

* * * * *